United States Patent [19]
Thomas et al.

[11] Patent Number: 6,091,082
[45] Date of Patent: Jul. 18, 2000

[54] ELECTROSTATIC DISCHARGE PROTECTION FOR INTEGRATED CIRCUIT SENSOR PASSIVATION

[75] Inventors: Danielle A. Thomas, Dallas; Frank Randolph Bryant, Denton, both of Tex.

[73] Assignee: STMicroelectronics, Inc., Carrollton, Tex.

[21] Appl. No.: 09/024,094

[22] Filed: Feb. 17, 1998

[51] Int. Cl.[7] ........................................... G06K 9/00
[52] U.S. Cl. ........................ 257/77; 257/637; 257/640; 257/641; 257/651; 382/4; 382/124; 382/312; 340/825.34
[58] Field of Search .................. 257/651, 637, 257/77, 644, 640, 641; 382/4, 124, 312; 340/825.34

[56] References Cited

U.S. PATENT DOCUMENTS

| | | | |
|---|---|---|---|
| 3,781,855 | 12/1973 | Killen | 340/146.3 E |
| 3,967,310 | 6/1976 | Horiuchi et al. | 357/54 |
| 4,016,490 | 4/1977 | Weckenmann et al. | 324/61 R |
| 4,161,743 | 7/1979 | Yonezawa et al. | 357/54 |
| 4,353,056 | 10/1982 | Tsikos | 340/146.3 |
| 4,394,773 | 7/1983 | Ruell | 382/4 |
| 4,428,670 | 1/1984 | Ruell et al. | 356/71 |
| 4,429,413 | 1/1984 | Edwards | 382/4 |
| 4,513,298 | 4/1985 | Scheu | 346/140 R |
| 4,571,543 | 2/1986 | Raymond et al. | 324/425 |
| 4,577,345 | 3/1986 | Abramour | 382/14 |
| 4,626,774 | 12/1986 | Regtien | 324/61 R |
| 4,814,691 | 3/1989 | Garbini et al. | 324/61 R |
| 4,935,207 | 6/1990 | Stanboro et al. | 422/68.1 |
| 5,324,442 | 6/1994 | Knapp | 382/4 |
| 5,430,381 | 7/1995 | Dower | 324/452 |
| 5,530,581 | 6/1996 | Cogan | 359/265 |
| 5,659,626 | 8/1997 | Ort et al. | 382/125 |
| 5,778,089 | 7/1998 | Borza | 382/124 |
| 5,862,248 | 1/1999 | Salatino et al. | 382/124 |
| 5,869,791 | 2/1999 | Young | 178/20.01 |
| 5,953,441 | 9/1999 | Setlak | 382/124 |

FOREIGN PATENT DOCUMENTS

| | | |
|---|---|---|
| 0 710 593 A1 | 5/1996 | European Pat. Off. . |
| 0 779 497 A2 | 6/1997 | European Pat. Off. . |
| 0 779 497 A3 | 6/1997 | European Pat. Off. . |
| 0 786 745 A2 | 7/1997 | European Pat. Off. . |
| 0 786 745 A3 | 7/1997 | European Pat. Off. . |
| 0 790 479 | 8/1997 | European Pat. Off. .......... G01B 7/00 |
| 0 791 899 A2 | 8/1997 | European Pat. Off. . |
| 0 791 899 A3 | 8/1997 | European Pat. Off. . |
| 2 279 756 | 1/1995 | United Kingdom .......... G01N 27/22 |
| 2279757A | 1/1995 | United Kingdom . |
| 2312514A | 10/1997 | United Kingdom . |
| WO 97/40744 | 11/1997 | WIPO . |
| WO 98/49691 | 11/1998 | WIPO . |
| WO 99/28701 | 6/1999 | WIPO . |

OTHER PUBLICATIONS

Wolffenbuttel et al., "Integrated Tactile Imager With An Intrinsic Contour Dectection Option," *Sensors and Actuators* 16(1/2):141–153, 1989.

Young et al., "Novel Fingerprint Scanning Arrays Using Polysilicon TFT's on Glass and Polymer Substrates," *IEEE Electron Device Letters* 18(1):19–20, 1997.

Tartagni et al., "A 390dpi Live Fingerprint Imager Based on Feedback Capacitive Sensing Scheme," *In Proceedings of the IEEE International Solid–State Circuits Conference*, Feb. 7, 1995, 5 pgs.

"Silicon Fingerprint Sensor Offers Cost–Effective Biometric Solution for Security," SGS–Thompson Microelectronics Press Release, Nov. 1997.

"TouchChip™ Silicon Fingerprint Sensor," SGS–Thompson Microelectronics Press Release, Nov. 1997.

"SGS–Thompson Develops First Microchip That Records Fingerprints Electronically On Contact," SGS–Thompson Microelectronics Press Release, May 1997.

*Primary Examiner*—William Mintel
*Attorney, Agent, or Firm*—David V. Carlson; Theodore E. Galanthay; Lisa K. Jorgenson

[57] ABSTRACT

A structure and method for creating an integrated circuit passivation (24) comprising, a circuit (16), a dielectric (18), and metal plates (20) over which an insulating layer (26) is disposed that electrically and hermetically isolates the circuit (16), and a discharge layer (32) that is deposited to form a passivation (24) that protects the circuit (16) from electrostatic discharges caused by, e.g., a finger, is disclosed.

33 Claims, 1 Drawing Sheet

ELECTROSTATIC DISCHARGE PROTECTION FOR INTEGRATED CIRCUIT SENSOR PASSIVATION

TECHNICAL FIELD OF THE INVENTION

The present invention relates in general to the field of detection, and more particularly, to a structure and method for protecting integrated circuit sensors from the environment of intended use.

BACKGROUND OF THE INVENTION

Without limiting the scope of the invention, its background is described in connection with the protection of integrated circuit fingerprint sensors from the environment during regular use, as an example.

Heretofore, in this field, the detection of fingerprint patterns has been useful for the identification of specific individuals based on the observation that each individual person has a unique fingerprint. Fingerprints, therefore, can be used not only to positively identify individuals, but to exclude individuals whose fingerprint profile does not match a pre-existing set of patterns.

Fingerprint sensing has evolved from optical and mechanical sensing technology that acquires a fingerprint image. Generally, the mechanical and optical sensors obtained a fingerprint image using a scanner or a camera, processed the acquired information into an analog or digital signal that could be analyzed, and provided an output based on the acquired signal. Unfortunately, the lighting and contrast conditions available at the time the image was acquired affected the analysis and consequently the output from the sensor.

Another class of fingerprint sensors are capacitive sensors, such as that disclosed in U.S. Pat. No. 4,353,056 issued to Tsikos. The Tsikos patent demonstrates the use of a sensor that incorporates a sensing member that has a sensing surface for receiving a fingerprint. The sensing surface has a means for sensing the ridges and valleys of the skin of the finger under observation. A sensing member containing a multitude of capacitors that sense the patterns of the fingerprint when the finger is pressed against the sensing surface. The information obtained is transformed into an electric signal. The capacitors are insulated from the environment of use by a flexible membrane that conforms itself to the contour of the fingerprint. Unfortunately, the repeated cycles of flexing and compression of the flexible membrane can lead to device failure and the need to replace the membrane.

U.S. Pat. No. 4,353,056 issued to Ruell, et al., discloses a fingerprint sensor that provides an electric output signal in response to the topographic relief of the fingerprint. The sensor incorporates a contact body that is formed at least in part by a light transparent elastic material. The elastic contact material can be attached to a flat sensor plate that has a light receiving surface. The sensor also incorporates a light source and a photodetector to measure the valleys and ridges of the fingerprint. The elastic nature of the contact body, of the above described sensor causes cycles of compression and flexing that lead to the deterioration of the contact point between the sensor and the finger.

SUMMARY OF THE INVENTION

It has been found, however, that the present methods and structures for protecting fingerprint sensors from the environment of intended use fails to address the distinct environmental exposures to which the sensors are exposed. For example, under ideal conditions the user would gently place the finger on the plate without an excess of pressure or shock. Unfortunately, it is the case that the sensor surface will be exposed to a wide variety of pressures, but that objects other than fingers might come in contact with the sensor surface.

Another problem with current sensors is the need to protect the sensor from electrostatic discharges, e.g., static electricity, caused by the user and the sensor being at different voltage potentials. A user can be exposed to environmental conditions that cause a great increase in potential in comparison to objects that are at a different potential or grounded. When the user presses the sensor at a great voltage disparity, the sudden discharge may cause operational failure of the sensor, both temporary and permanent. The current flowing from the discharge may be small. However, damage to the data flowing from the sensor or to the sensor itself can still occur. While damage to the data or the sensor should be avoided, the sensitivity of the sensor should be maintained at close to optimal levels.

Yet another significant problem of current structures for the protection of fingerprint sensors are the contaminants, such as oils and proteins that are found on the surface of fingers. To remove these contaminants it will be the case that organic and inorganic solvents and detergents will be needed to clean the sensor surface.

Another area of concern is hygiene. Fingers, as well as the environment, tend to contain a number of microbes that need to be removed from the sensor along with finger contaminants. To remove these materials and reduce the chance of contagion between users, antibacterial, antifungal and decontaminating agents are used to clean the sensors. These decontaminating agents can often include harsh abrasives, enzymes, organic and inorganic solvents and detergents. Furthermore, the sensors are exposed to oxidating environments, UV rays, and the like during normal use.

What is needed is a structure and method to protect fingerprint sensors from electrostatic discharges, while at the same time maintaining the sensors' ability to withstand mechanical stress. The structure must not only permit continued functioning of the sensor during normal use, but be able to withstand, among others, the extreme conditions of humidity, electricity, heat, light, etc., to which the sensor may be exposed. The sensor structure should also be resistant to chemical detergents and solvents, but be compatible with the underlying components of the sensor.

In one embodiment, the present invention is directed to an integrated circuit passivation comprising, an integrated circuit, over which an insulating layer is disposed. The insulating layer helps to electrically isolate the integrated circuit from subsequent layers and the environment. Next, a discharge layer is formed that is electrically or semi-electrically conductive. The discharge layer dissipates electrical discharges that may be caused when a user touches the sensor. A mechanical protection layer may also be disposed over the discharge layer to provide hermetic and mechanical protection for the underlying circuit. The discharge layer may comprise a silicon-based layer that is partially doped to increase conductivity. In one embodiment the discharge layer is an $SiC_x$ layer, where x is less than 1.

One preferred use of a circuit for use with the present invention is a fingerprint sensor, which can be, e.g., a capacitively coupled fingerprint sensor. In one embodiment, the mechanical protection layer and the discharge layer are the same, and can comprise a mixture of silicon carbide and a $SiC_x$ layer, where x is less than 1. In yet another embodiment of the invention, the mechanical protection layer and the discharge layer are formed at the same time and have a chemical formula of $SiC_x$, wherein the stoichiometry of the carbide component is varied throughout the deposition of the discharge layer in order to optimize the conductivity and maximize the hardness of the mechanical protection layer.

The present inventors recognize that the sensitivity of an integrated circuit sensor can be degraded by adding a highly conductive layer, such as a metal layer. Likewise, it is herein recognized that the discharge layer or sensor surface should be resistant to mechanical stress caused by environmental conditions and use, e.g., scratches. Therefore, the inventors electrically isolate the functional components of the sensor, for example, capacitors, by disposing a first insulating layer. In one embodiment, the sensor is protected from electrostatic discharges by a passivation that can integrally contain one or more semi-electrically conductive layers, with at least one layer being a discharge layer. Preferably, the discharge layer is an $SiC_x$ layer, where x is varied to maximize hardness and optimize conductivity. In another preferred embodiment the discharge layer is a silicon-based layer that is doped to optimally bleed electrical discharges, while at the same time maintaining sensor device sensitivity. The mechanical protection layer and the discharge layer should be compatible and, in one embodiment, can be disposed on the insulating layer concurrently. Concurrent deposition of the mechanical protection layer and the discharge layer can be accomplished by, for example, beginning the preposition with SiC and thereafter decreasing the amount of carbon to make a $SiC_x$ layer, where x is less than 1.

In another embodiment, the insulating layer of the integrated circuit passivation can be a silicon oxide layer. Alternatively, the first insulating layer can be silicon nitride. The integrated circuit passivation may further comprise a second insulating layer disposed between the first insulating layer and the mechanical protection layer. The second insulating layer can be silicon oxide or silicon nitride. In yet another embodiment the insulating layer is silicon oxide, and the second insulating layer is silicon nitride, with the discharge layer whose hardness is greater than that of silicon nitride being partially conductive. A mechanical protection layer can also be disposed above or below the discharge layer.

Yet another embodiment of the present invention is a method of fabricating a fingerprint sensor passivation comprising the steps of, obtaining an integrated circuit, depositing an insulating layer on the integrated circuit and depositing over the first insulating layer a discharge layer that is semi-electrically conductive. The method may further comprising the step of depositing a second insulating layer between the first insulating layer and the discharge layer, and may also include depositing a mechanical protection layer on or below the discharge layer. The mechanical protection layer and the discharge layer should be compatible and, in one embodiment, can be disposed on the insulating layer concurrently. Concurrent deposition of the mechanical protection layer and the discharge layer may be conducted, and can be accomplished by, for example, beginning the preposition with SiC and thereafter decreasing the amount of carbon to make a $SiC_x$ layer, where x is less than 1.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention and do not delimit the scope of the invention.

Figure 1:
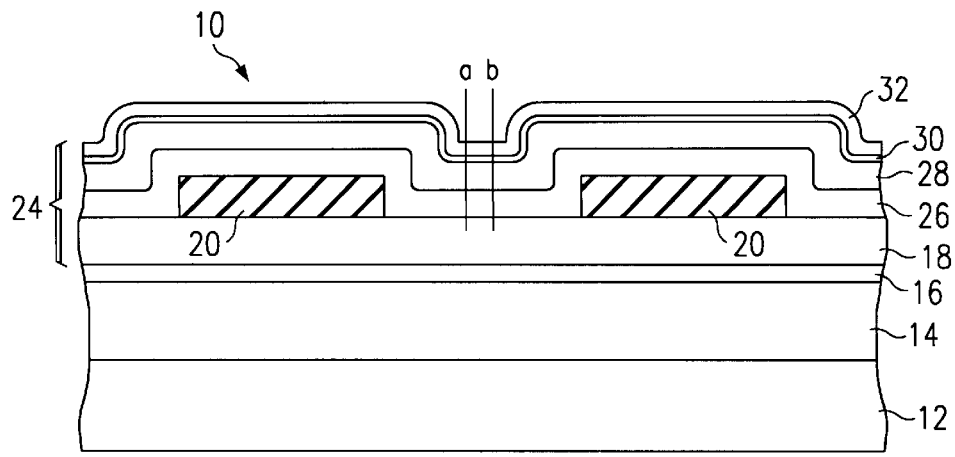
FIG. 1 is an illustrative cross section of an integrated circuit fingerprint sensor.

The general features of a fingerprint sensor are shown in FIG. 1. A sensor 10, such as a capacitively coupled fingerprint sensor, is formed on a silicon substrate 14 which may be placed on a backside support plastic laminate 12. Substrate 14 can have a conductivity type which is one of either a P-type conductivity or a N-type conductivity. Substrate 14 may be made of silicon, gallium arsenide, silicon on insulator (SOI) structures, epitaxial formations, germanium, germanium silicon, polysilicon, amorphous silicon, and/or like substrate, semi-conductive or conductive. The substrate 14 is typically made of single crystal silicon, and is usually lightly doped with boron, phosphorous or arsenic atoms.

A circuit 16 is formed over the substrate 14 and controls the reporting functions of the silicon sensor 10. A dielectric 18 prevents conductivity between the circuit 16 and the metal plates 20.

The structure and method of the present invention can be used with a wide variety of imaging sensors, such as the fingerprint sensor described herein as an example, and as will be known to those skilled in the art in light of the present disclosure. The fingerprint sensor 10 can have two metal plates 20 that are placed next to the cell area and are separated from the surface of the finger by a passivation 24. The surface of the skin acts as a third plate opposed the two metal layers or metal plates 20. This structure realizes a two-series connected capacitor circuit. The metal plates 20 can be separately connected to the input and output of a high-gain inverter.

The sensor 10 can work in two phases. First, the charge integrator is reset, shorting the input and output of the inverter. During this phase, the output of the inverter settles to its logic threshold. In the second phase, a fixed amount of charge is sinked from the input causing an output voltage swing that is inversely proportional to the feedback capacitance value. Since the feedback capacitance is inversely proportional to the distance of the skin from the circuit 16, a linear dependence of output voltage depending on the skin distance can be provided.

For a fixed amount of sinked charge, the output voltage of the inverter will range between two extremes depending on the feedback capacitance value. One extreme is the upper saturation level which is attained if no feedback capacitance is present. The second extreme yields a value close to the logical threshold when the feedback capacitance is large, namely, when a capacitance due to the close proximity of a finger surface is present.

Using the above described capacitance-coupled sensor, resolutions of 390 dots per inch (dpi) can be achieved. With improvements in image processing algorithms, sensors having a resolution of 750 dpi can be expected. For use in sensing fingerprint valleys and ridges, an array of cells is used to sample the fingerprint pattern. The entire chip can also contain timing and voltage controls and references.

Figure 2:
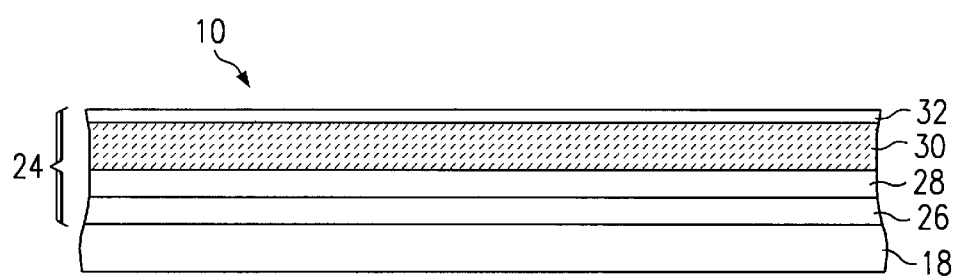
FIG. 2 is a partial, enlarged cross-section of one embodiment of a structure for use with a fingerprint sensor between the a-b lines of FIG. 1.

The structure of passivation 24 for use with the present invention, in one embodiment, is described in conjunction with FIG. 2 (generally a section of passivation 24 taken between lines a and b of FIG. 1 and not showing any of the structure below circuit 16). Passivation 24 and its component layers are shown in cross-section over dielectric 18. The insulating layer 26 can be deposited using plasma enhanced deposition (PED) and electrically isolated the above layers from the dielectric 18. The insulating layer 26 is deposited over dielectric 18, and can be a dielectric layer such as a deposited silicon oxide or a glass. The glass can be doped with, e.g., phosphate, boron or both. The thickness of the insulating layer 26 can be varied by, for example, changing the bias on the silicon wafer during deposition. Disposed over insulating layer 26 is a silicon nitride layer 28, which can also be disposed by PED. Next, a mechanical protection layer 30 is shown over silicon nitride layer 28, and can deposited by PED. The mechanical protection layer 30 can be, e.g., silicon carbide.

Finally, a discharge layer 32 is shown disposed over the mechanical protection layer 30. The discharge layer 32 can have a chemical composition of $SiC_x$, where the stoichiometric ratio of silicon to carbon can be varied to maximize the hardness of the discharge layer 32, while at the same time providing optional resistivity to maintain the functionality of the sensor 10. The semi-electrical conductivity of the discharge layer 32, however, must also be sufficient to transfer electrostatic discharges created at the surface of passivation 24 to electronic components of the sensor that dissipate the discharge (not depicted). Charge dissipation circuits are well known to those of skill in the art. In the embodiment depicted in FIG. 2, passivation 24 includes the insulating layer 26, silicon nitride layer 28, mechanical protection layer 30 and discharge layer 32.

The discharge layer 32 can also provide durability to the silicon sensor, and more particularly, the passivation 24. The thickness and composition of the discharge layer 32 can be varied to minimize the effect on the sensitivity of the sensor 10 caused by placing the semi-electrically conductive discharge layer 32 between the capacitance source, e.g., a finger, and the sensor 10 circuitry. The sensor 10 circuitry generally includes the metal layer or plates 20 and the circuit 16. Increasing the thickness of the discharge layer 32 improves conductivity of electrostatic discharges for a given configuration and conductivity. However, it is expected to reduce sensor sensitivity. Likewise, increasing the conductivity of the discharge layer 32 by, e.g., increasing its doping or the ratio of silicon to carbon, would also adversely affect sensitivity while at the same time increase the electrostatic discharge capabilities of the layer. For any given conductivity and configuration (or shape) of the circuit 16, the thickness of the discharge layer 32 can be varied to optimize discharge capacity and device sensitivity.

In one embodiment, the thickness of the discharge layer 32 is about 300 angstroms. The thickness of the layer can be increased or decreased depending on, e.g., the ratio of silicon to carbon, doping, shape and size of the sensor passivation 24, and the like, wherein minimizing the amount of carbon increases the conductivity of the discharge layer 32. By using PED and silicon-based layers, the adhesion between the layers is not a factor that may detrimentally affect device performance.

The discharge layer 32 also has the advantage that it can be deposited using the same equipment that is presently used to create a passivation 24 for use with, e.g., a fingerprint sensor. By using the current PED equipment the entire passivation 24 can be deposited at lower temperatures (300 degrees Celsius of less). Improved deposition can be performed by depositing the layers on a heated pedestal. Also, the discharge layer 32 is not necessarily a component of the sensor electronics, and can serve as a barrier layer.

Another advantage of using a $SiC_x$ composition as the discharge layer 32 is that it does not generally diffuse into adjacent layers, and even if it did it would not affect device performance. In one embodiment, the discharge layer 32 is $SiC_x$, where x is less than 1. When used in conjunction with a silicon nitride layer 28, the combined layers can serve as oxygen, mobile ion and moisture barriers, thereby protecting the underlying electronics. By having a higher carbon stoichiometry, the discharge layer 32 can also aid in improving the scratch resistance of the passivation 24 due to its coefficient of hardness.

Figure 3:
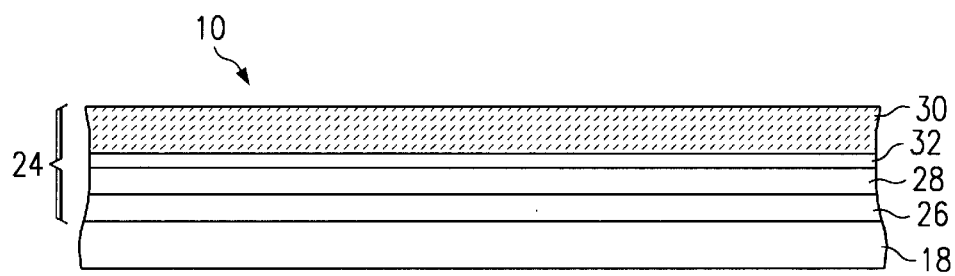
FIG. 3 is a cross-section of another embodiment of a structure for use with a fingerprint sensor between the a-b lines of FIG. 1.

Another embodiment is described in conjunction with FIG. 3. Like FIG. 2, in FIG. 3 the passivation 24 is shown in partial cross-section over circuit 16. Insulating layer 26 is disposed over dielectric 18 using, for example, PED. Disposed directly over insulating layer 26 is a nitride layer 28 that is covered by the discharge layer 32. Over the discharge layer 32 is the mechanical protection layer 30. The configuration for the passivation 24 depicted in FIG. 3 is expected to provide better scratch resistance than the passivation 24 depicted in FIG. 2. However, it may be expected to have less discharge potential.

Figure 4:
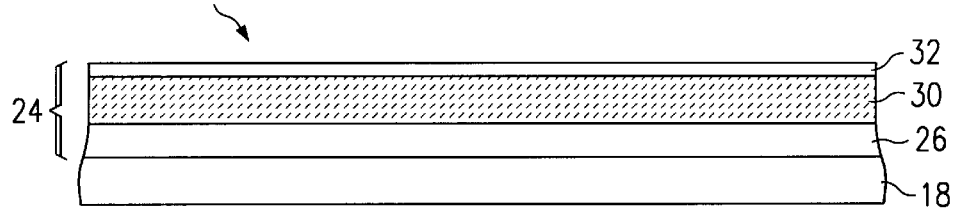
FIG. 4 is a cross-section of another embodiment of a structure for use with a fingerprint sensor between the a-b lines of FIG. 1.

An alternative embodiment of the invention is shown in FIG. 4, in which the passivation 24 comprises an insulating layer 26 disposed over the dielectric 18. Directly on the insulating layer 26 is deposited the mechanical protection layer 30. Over the mechanical protection layer 30 is the discharge layer 32. This passivation 24 provides the necessary insulation and strength for protecting the circuit 16 and reduces the number of steps required to form the passivation 24. The configuration depicted in FIG. 4, however, may not have the same moisture and oxidation resistance attributes conferred by the nitride layer 28 used in the above described figures.

Figure 5:
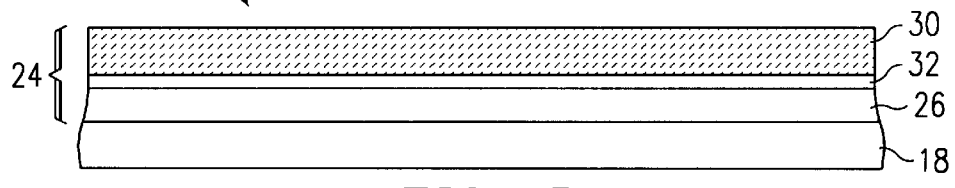
FIG. 5 is a cross-section of yet another embodiment of a structure for use with a fingerprint sensor between the a-b lines of FIG. 1.

An alternative embodiment of the invention is shown in FIG. 5, in which the passivation 24 comprises an insulating layer 26 disposed over the dielectric 18. Directly on the insulating layer 26 is deposited the discharge layer 32 followed by deposition of the mechanical protection layer 30. As with the configuration described for FIG. 4, this passivation 24 provides the necessary insulation and strength for protecting the circuit 16 and reduces the number of steps required to form the passivation 24. However, it may not have the same moisture and oxidation resistance attributes conferred by the nitride layer 28.

When viewed in conjunction, FIGS. 4 and 5 show the extremes of a spectrum for the discharge layer 32. The mechanical protection layer 30 and the discharge layer 32 can actually be one and the same. However, the stoichiometry of silicon to carbon can be varied throughout the discharge layer 32 to optimize the discharge capacity of the discharge layer 32, while at the same time maximizing the hardness of the passivation 24. For example, the portion of the passivation 24 closest to the insulating layer 26 can have a $SiC_x$ stoichiometry closest to 1. As the passivation 24 is deposited, the stoichiometry of silicon to carbon can be varied to reduce the amount of carbon in the $SiC_x$ mixture that is deposited to increase the conductivity of the discharge layer 32. The passivation 24 may also be doped concurrently, or after, deposition.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. An integrated circuit comprising:
   sensor circuitry; and
   a passivation comprising:
      an insulating layer disposed over the sensor circuitry to electrically isolate the sensor circuitry; and
      a conductive discharge layer disposed over the insulating layer, wherein the discharge layer diffuses electrostatic charges to electronic components that dissipate the electrostatic charges if the passivation is contacted.

2. The integrated circuit of claim 1, wherein the insulating layer comprises glass.

3. The integrated circuit of claim 1, wherein the insulating layer comprises silicon oxide.

4. The integrated circuit of claim 1, further comprising:
   a silicon nitride layer disposed over the insulating layer;
   a silicon carbide layer disposed over the silicon nitride layer; and
   wherein the discharge layer comprises $SiC_x$, and wherein x is less than 1.

5. The integrated circuit of claim 1, wherein the discharge layer is doped.

6. The integrated circuit of claim 1, wherein the insulating layer is doped.

7. The integrated circuit of claim 1, wherein the discharge layer comprises $SiC_x$, where x is less than 1.

8. The integrated circuit of claim 1, wherein the discharge layer comprises $SiN_x$, where x is less than 1.

9. The integrated circuit of claim 1, further comprising:
   a silicon carbide layer disposed over a silicon nitride layer; and
   wherein the discharge layer comprises $SiC_x$, wherein x is less than 1.

10. The integrated circuit of claim 1, further comprising:
    a silicon carbide layer disposed over the silicon nitride layer; and
    a discharge layer, wherein the discharge layer is $SiN_x$, wherein x is less than 1.

11. The integrated circuit of claim 1, wherein the insulating layer comprises silicon nitride.

12. The integrated circuit of claim 1, wherein the discharge layer comprises a mixture of silicon carbide and $SiC_x$, wherein x is less than 1.

13. The integrated circuit of claim 1, wherein the discharge layer comprises a mixture of silicon carbide and $SiN_x$, wherein x is less than 1.

14. The integrated circuit of claim 1, wherein said passivation comprises part of a fingerprint sensor.

15. A capacitance-coupled fingerprint sensor comprising:
    sensor circuitry; and
    a passivation comprising:
       an insulating layer disposed over the sensor circuitry to electrically isolate the sensor circuitry; and
       a conductive discharge layer disposed over the insulating layer, wherein the discharge layer diffuses electrostatic charges to electronic components that dissipate the electrostatic charges if a finger touches the passivation, the discharge layer having a hardness greater than that of silicon nitride.

16. The fingerprint sensor of claim 15, wherein the insulating layer comprises glass.

17. The fingerprint sensor of claim 15, wherein the insulating layer comprises silicon oxide.

18. The fingerprint sensor of claim 15, further comprising:
    a silicon nitride layer disposed over the insulating layer;
    a silicon carbide layer disposed over the silicon nitride layer; and
    a silicon-carbon layer wherein the stoichiometry of carbon to silicon is less than 1.

19. The fingerprint sensor of claim 15, wherein the discharge layer is doped.

20. The fingerprint sensor of claim 15, wherein the insulating layer is doped.

21. The fingerprint sensor of claim 15, wherein the discharge layer comprises $SiC_x$, where x is less than 1.

22. The fingerprint sensor of claim 15, wherein the discharge layer comprises $SiN_x$, where x is less than 1.

23. The fingerprint sensor of claim 15, further comprising:
    a silicon carbide layer disposed over the silicon nitride layer; and
    a silicon-carbon layer wherein the stoichiometry of carbon to silicon is less than 1.

24. The fingerprint sensor of claim 15, further comprising:
    a silicon carbide layer;
    a silicon nitride layer; and
    a silicon-nitride layer wherein the stoichiometry of nitrogen to silicon is less than 1.

25. The fingerprint sensor of claim 15, wherein the insulating layer comprises silicon nitride.

26. The fingerprint sensor of claim 15, wherein the discharge layer comprises a mixture of silicon carbide and $SiC_x$, wherein x is less than 1.

27. The fingerprint sensor of claim 15, wherein the discharge layer comprises a mixture of silicon nitride and $SiN_x$, wherein x is less than 1.

28. The fingerprint sensor of claim 15, wherein the discharge layer is formed as a mixture of silicon carbide and $SiC_x$, wherein in an early part of the deposition x is 1, and in a later part of the deposition the x is less than 1.

29. The fingerprint sensor of claim 15, wherein the discharge layer is formed as a mixture of silicon nitride and $SiN_x$, wherein in an early part of the deposition x is 1, and in a later part of the deposition the x is less than 1.

30. An integrated circuit passivation on a fingerprint sensor integrated circuit, the passivation comprising:

a conductive discharge layer disposed over the fingerprint sensor circuitry, wherein the discharge layer diffuses electrostatic charges to electronic components that dissipate the electrostatic charges if a finger touches the passivation.

31. The passivation of claim 30 wherein the discharge layer comprises a doped material.

32. The passivation claim 30, further comprising a mechanical protection layer.

33. The passivation of claim 30 wherein the discharge layer includes a mechanical protection layer.

* * * * *